US008961794B2

(12) United States Patent
Fjare et al.

(10) Patent No.: US 8,961,794 B2
(45) Date of Patent: Feb. 24, 2015

(54) METAL IMPURITY AND HIGH MOLECULAR WEIGHT COMPONENTS REMOVAL OF BIOMASS DERIVED BIOCRUDE

(75) Inventors: Kristi Fjare, Bartlesville, OK (US); Jianhua Yao, Bartlesville, OK (US); Edward L. Sughrue, Bartlesville, OK (US); Jaehoon Bae, Bartlesville, OK (US); TiePan Shi, Bartlesville, OK (US); Yun Bao, Bartlesville, OK (US); Edgar Lotero, Cleveland, OK (US)

(73) Assignee: Phillips 66 Company, Houston, TX (US)

( * ) Notice: Subject to any disclaimer, the term of this patent is extended or adjusted under 35 U.S.C. 154(b) by 340 days.

(21) Appl. No.: 13/177,738

(22) Filed: Jul. 7, 2011

(65) Prior Publication Data
US 2012/0023810 A1    Feb. 2, 2012

Related U.S. Application Data

(60) Provisional application No. 61/368,871, filed on Jul. 29, 2010.

(51) Int. Cl.
| B01D 11/04 | (2006.01) |
| B01D 11/02 | (2006.01) |
| C10G 21/06 | (2006.01) |
| C10G 21/14 | (2006.01) |
| C10G 21/16 | (2006.01) |
| C10G 3/00 | (2006.01) |
| C10G 1/02 | (2006.01) |
| C10G 21/02 | (2006.01) |
| C10L 1/02 | (2006.01) |
| C10L 1/00 | (2006.01) |

(52) U.S. Cl.
CPC .............. *C10G 3/40* (2013.01); *B01D 11/0492* (2013.01); *B01D 11/0288* (2013.01); *C10G 1/02* (2013.01); *C10G 21/02* (2013.01); *C10G 2300/1014* (2013.01); *C10G 2300/205* (2013.01); *C10G 2300/208* (2013.01); *C10G 2400/02* (2013.01); *C10G 2400/04* (2013.01); *C10G 2400/08* (2013.01); *C10L 1/02* (2013.01); *C10L 1/023* (2013.01); *C10L 1/026* (2013.01); *C10G 2300/44* (2013.01)
USPC .............................. 210/634; 585/240; 44/307

(58) Field of Classification Search
None
See application file for complete search history.

(56) References Cited

U.S. PATENT DOCUMENTS 4,209,647 A * 6/1980 Gallivan et al. ............... 568/762
4,559,130 A   12/1985 Reynolds et al.
(Continued)

FOREIGN PATENT DOCUMENTS

EP    1728844    6/2006

OTHER PUBLICATIONS

Mohan et al. Pyrolysis of wood/biomass for bio-oil: A critical review. Energy & Fuels (2006) 20, 848-889.*
Elliott, Douglas. Water, alkali and char in flash pyrolysis oil. Biomass and Bioenergy (1994) vol. 7, No. 1, 179-185.*

(Continued)

*Primary Examiner* — Katherine Zalasky
(74) *Attorney, Agent, or Firm* — Phillips 66 Company

(57) ABSTRACT

This invention relates to a process for production of transportation fuels from biomass. More particularly, this invention relates to a process for using solvent to remove metal impurities and high molecular weight components from biomass derived biocrude to prevent potential catalyst poisoning and catalyst bed plugging in biocrude-to-transportation fuel upgrading process.

19 Claims, 2 Drawing Sheets

(56) References Cited

U.S. PATENT DOCUMENTS

| | | | |
|---|---|---|---|
| 4,645,589 A * | 2/1987 | Krambeck et al. | 208/251 R |
| 4,670,613 A * | 6/1987 | Ruyter et al. | 585/240 |
| 4,762,529 A * | 8/1988 | Schulz | 44/309 |
| 4,839,029 A | 6/1989 | Ichikawa et al. | |
| 5,041,209 A | 8/1991 | Cha et al. | |
| 5,223,601 A | 6/1993 | Chum et al. | |
| 5,948,242 A | 9/1999 | Ohsol et al. | |
| 6,093,311 A | 7/2000 | Blum et al. | |
| 6,350,372 B1 | 2/2002 | Degnan et al. | |
| 6,905,593 B2 | 6/2005 | Kuehne et al. | |
| 2003/0150779 A1 | 8/2003 | Collins et al. | |
| 2006/0086664 A1 * | 4/2006 | Wills | 210/634 |

OTHER PUBLICATIONS

Matyash et al. Lipid extraction by methyl-tert-butyl ether for high-throughput lipidomics. Journal of Lipid Research (2008) 49, 1137-1146.*

Diebold, et al., "Additives to Lower and Stabilize the Viscosity of Pyrolysis Oils During Storage", Energy & Fuels, 11:1081-91 (1997).

Agblevor, et al., "Inorganic Compounds in Biomass Feedstocks. 1. Effect on the Quality of Fast Pyrolysis Oils," Energy & Fuels 10, p. 293-298 (1996).

Reynolds, "Nickel in Petroleum Refining," Petroleum Science and Technology, 19(7-8) (2001).

Huber, et al., "Synthesis of transportation fuels from biomass: chemistry, catalysts, and engineering," Chem. Rev. 106, 4044-4098, 2006.

* cited by examiner

METAL IMPURITY AND HIGH MOLECULAR WEIGHT COMPONENTS REMOVAL OF BIOMASS DERIVED BIOCRUDE

CROSS-REFERENCE TO RELATED APPLICATIONS

This application is a non-provisional application which claims benefit under 35 USC §119(e) to U.S. Provisional Application Ser. No. 61/368,871 filed Jul. 29, 2010, entitled "METAL IMPURITY AND HIGH MOLECULAR WEIGHT COMPONENTS REMOVAL OF BIOMASS DERIVED BIOCRUDE," which is incorporated herein in its entirety.

STATEMENT REGARDING FEDERALLY SPONSORED RESEARCH

None.

FIELD OF THE INVENTION

This invention relates to a process for production of transportation fuels from biomass. More particularly, this invention relates to a process for removing metal impurities and high molecular weight components from biomass derived biocrude to prevent potential catalyst poison in biocrude-to-transportation fuel upgrading process.

BACKGROUND OF THE INVENTION

There is a national interest in the discovery of alternative sources of fuels and chemicals, other than from petroleum resources. As the public discussion concerning the availability of petroleum resources and the need for alternative sources continues, government mandates will require transportation fuels to include, at least in part, hydrocarbons derived from sources besides petroleum. As such, there is a need to develop alternative sources for hydrocarbons useful for producing fuels and chemicals.

One possible alternative source of hydrocarbons for producing fuels and chemicals is widely available so called "biomass", such as for example, lignocelluloses, starches, vegetable oils, algaes, and etc. It is also known that solid biomass such as the low cost and widely available lignocelluloses can be converted to liquid biocrude via acid hydrolysis process, pyrolysis process, liquefaction process, gasification and/or many other processes. The biocrude content various depend upon the type of the biomass and the type of conversion process being used. For example, the biocrude can be tars, acids, chars, alcohols, aldehydes, esters, ketone, aromatics and etc. if the biocrude are produced by pyrolysis of lignocelluloses; the biocrude can be monomer sugar units such as C5 or C6 sugars if the biocrude is produced by hydrolysis of lignocelluloses.

Biomass derived biocrude typically will need to be upgraded if it is to be used as transportation fuels such as diesel and gasoline. However, often times, the biomass derived biocrude contains significant amount of metal impurities (e.g. Na, K, Ca, Mg, and etc), which can have detrimental effects in the upgrading process, especially when a catalytic process is used for the upgrading process. For example, it can cause catalyst deactivation and plugging of the reactor catalyst bed. The biomass-derived biocrude, especially pyrolysis oil, may contain high molecular weight components. These materials also cause plugging and fouling of the catalyst bed because they are too large to react in the pores of the catalyst.

As such, it is desirable to develop a process for removing metal impurities and high molecular weight components from biomass derived biocrude to prevent potential catalyst poisoning and catalyst bed plugging in biocrude-to-transportation fuel upgrading process.

BRIEF SUMMARY OF THE DISCLOSURE

This invention relates to a process for production of transportation fuels from biomass. More particularly, this invention relates to a process for using solvent to remove metal impurities and high molecular weight components from biomass derived biocrude to prevent potential catalyst poisoning and catalyst bed plugging in biocrude-to-transportation fuel upgrading process.

In one embodiment of the current invention, there is disclosed a process for removing metal impurities comprising high molecular weight components from a biomass derived biocrude comprising the steps of: a) providing a biomass derived biocrude comprising at least one metal impurity; wherein said metal impurity comprises at least one high molecular weight component; b) admixing the biomass derived biocrude with first solvent and second solvent to form a mixture; c) subjecting the mixture to a separation device to form a liquid phase and a solid phase; and d) recovering the liquid phase.

In another embodiment of the current invention, there is disclosed a process for upgrading a biomass derived biocrude to a fuel range hydrocarbon comprising the steps of: a) providing a biomass derived biocrude comprising at least one metal impurity; wherein said metal impurity comprises at least one high molecular weight component; b) admixing the biomass derived biocrude with first solvent and second solvent to form a mixture; c) subjecting the mixture to a separation device to form a liquid phase and a solid phase; and d) recovering and reacting the liquid phase with a catalyst under a condition sufficient to produce a reaction product containing fuel range hydrocarbon.

In yet another embodiment of the current invention, there is a process for converting a biomass to a fuel range hydrocarbon comprising the steps of: a) pyrolyzing a biomass to produce a biomass derived biocrude comprising at least one metal impurity, wherein said metal impurity comprises at least one high molecular weight component; b) admixing the biomass derived biocrude with first solvent and second solvent to form a mixture; c) subjecting the mixture to a separation device to form a liquid phase and a solid phase; and d) recovering and reacting the liquid phase with a catalyst under a condition sufficient to produce a reaction product containing fuel range hydrocarbon.

Referring to all embodiment disclosed above, the liquid phase comprises less than 50% of the amount of the metal impurity compare to which is in said biomass derived biocrude in step (a), and the liquid phase comprises less than 15% of the amount of the high molecular weight components compare to which is in the biomass derived biocrude in step (a). The liquid phase may have less than 50%, 40%, 30%, 20%, 10%, or non-detectable amounts of the total metal impurity from the original biocrude. The liquid phase may have less than 15%, 12.5%, 10%, 9%, 8%, 7%, 6%, 5%, 4%, 3%, 2%, 1% or non-detectable amounts of any high molecular weight components from the original biocrude.

BRIEF DESCRIPTION OF THE DRAWINGS

A more complete understanding of the present invention and benefit thereof may be acquired by referring to the following description taken in conjunction with the accompanying drawings in which.

DETAILED DESCRIPTION

Figure 1:
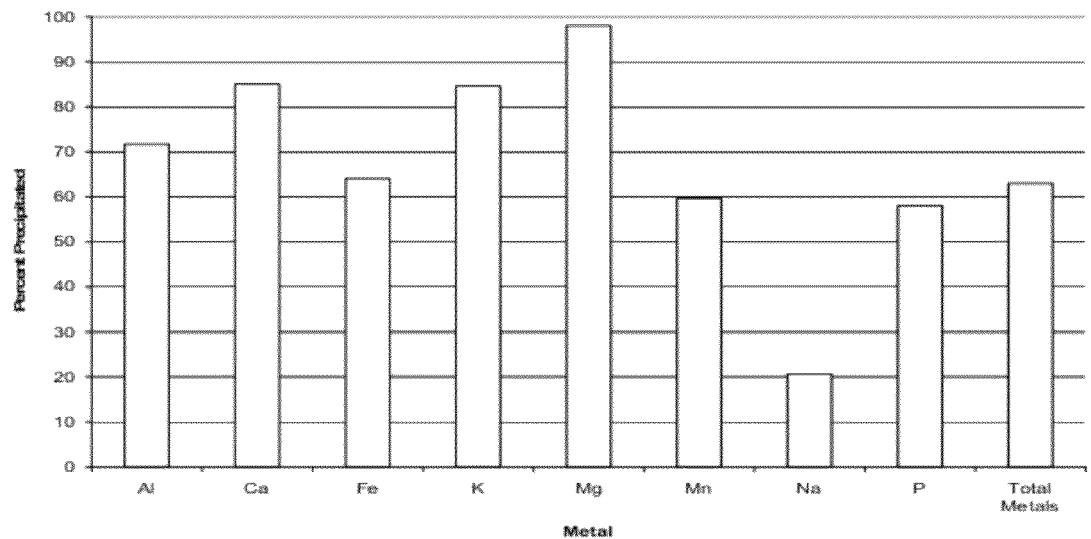
FIG. 1: Proportion of Metals Precipitated from Corn Fiber Pyrolysis Oil Using Methanol/MTBE.

Turning now to the detailed description of the preferred arrangement or arrangements of the present invention, it should be understood that the inventive features and concepts may be manifested in other arrangements and that the scope of the invention is not limited to the embodiments described or illustrated. The scope of the invention is intended only to be limited by the scope of the claims that follow.

According to the embodiments of the current invention, biomass may be converted to form a hydrocarbon mixture useful for liquid fuels and chemicals. The term, "Biomass," is used generally to refer to any non-fossilized organic matter. Useful biomass in the present invention include, but are not limited to, cellulosic and lignocellulosic materials such as "plant biomass", animal biomass (any animal by-product, animal waste, etc.) and municipal waste biomass (residential and light commercial refuse with recyclables such as metal and glass removed). Biomass includes solids that are not soluble in water. In particular, biomass may include, but is not limited to, cellulose, lignin, hemicellulose, fatty acids, and/or triglycerides. While any biomass may be used, particular useful biomass in the present invention include what is so called "plant biomass" and "lignocellulosic biomass".

The term "plant biomass" refers to virtually any plant-derived organic matter (woody or non-woody). Plant biomass can include, but is not limited to, agricultural crop wastes and residues such as corn stover, wheat straw, rice straw, sugar cane bagasse, and the like. Plant biomass further includes, but is not limited to, trees, woody energy crops, wood wastes and residues such as softwood forest thinnings, barky wastes, sawdust, paper and pulp industry waste streams, wood fiber, and the like. Additionally grass crops, such as switchgrass and the like have potential to be produced on a large-scale as another plant biomass source. For urban areas, the best potential plant biomass feedstock includes yard waste (e.g., grass clippings, leaves, tree clippings, and brush) and vegetable processing waste.

The term "Lignocellulosic biomass" refers to any type of plant biomass such as, but not limited to, non-woody plant biomass; cultivated crops; grasses, e.g., C4 grasses, such as switchgrass, cord grass, rye grass, miscanthus, reed canary grass, or a combination thereof; sugar processing residues such as bagasse or beet pulp; agricultural residues, for example, soybean stover, corn stover, rice straw, rice hulls, barley straw, corn cobs, wheat straw, canola straw, rice straw, oat straw, oat hulls, corn fiber; wood materials such as recycled wood pulp fiber, sawdust, hardwood, for example aspen wood and sawdust, and softwood; or a combination thereof.

Solid biomass such as the low cost and widely available lignocelluloses can be converted to liquid biocrude via acid hydrolysis process, pyrolysis process, liquefaction process, gasification and/or many other processes. The biomass derived biocrude content various depend upon the type of the biomass and the type of conversion process being used. In one embodiment of the current invention where the biocrude is produced by pyrolysis of a biomass (e.g. lignocelluloses), the resulting biocrude can be pyrolysis oil, pyrolytic lignin, tars, acids, chars, alcohols, aldehydes, esters, ketone, aromatics, or any combination thereof. In another embodiment of the current invention where the biocrude is produced by hydrolysis of a biomass (e.g. lignocelluloses), the resulting biocrude can be sugar monomer (e.g. C5 or C6 sugars), sugar alcohol, one sugar or any combination thereof.

Generally, the biomass derived biocrude contains amounts of metal impurities. The elements that the biocrude contains generally comprises Na, K, Ca, Mg, Fe, Al, Si, Mn, P, or any combination thereof. The amounts of these metals are generally in the range of from about 1 ppmw to about 30,000 ppmw.

Pyrolysis oil biocrude also contains high molecular weight components which are organic oligomers or polymers derived from the carbohydrate and/or lignin components in the biomass. These high molecular weight components can be >950 Daltons in molecular weight and in some cases, >4000 Daltons. These high molecular weight polymeric components can cause fouling of the upgrading catalysts and may precipitate and cause plugging in the process equipment.

Any suitable solvent capable of precipitating the metal from the biomass derived biocrude may be useful in this invention. According to one embodiment of the current invention, a combination of two types of low-boiling polar solvents may be used for mixing with the biocrude. The benefit of using low-boiling polar solvent is that it can be easily be removed and recycled. The first solvent may include but not limited to methanol, ethanol, propanol, acetone, or any combination thereof. The second solvent may include but not limited to methyl ether (e.g. methyl-t-butyl ether or "MTBE"), diethyl ether, dipropyl ether, tetrahydrofuran, tetrahydrofurfuryl alcohol or any combination thereof.

The concentration of biocrude in first and second solvent may vary depend upon the type of the biocrude, and/or the type of the first and second solvent used. Any weight ratio enables the precipitation of the metals from the biocrude may be used. According to one embodiment of the present invention, the pyrolysis oil/first solvent/second solvent in the weight ratio is 10-1:1:1-20. The oil and solvent ratio may be X:Y:Z where X is the weight ratio of pyrolysis oil, Y is the weight ratio of the first solvent, and Z is the weight ratio of the second solvent. X may be any value from 1-10; Y may be 1, 2, 3, 4, or 5; and Z is any value from 1-20. The pyrolysis oil may be mixed with a first solvent and a second solvent in a weight ratio of 10-1:1:1-20, 10:1:Z, 9:1:Z, 8:1:Z, 7:1:Z, 6:1:Z, 5:1:Z, 4:1:Z, 3:1:Z, 2:1:Z; X:1:20, X:1:17.5, X:1:15, X:1:12.5, X:1:10, X:1:7.5, X:1:5, X:1:2.5, 1:1:1, 3:1:10. In another embodiment of the current invention, the corn fiber pyrolysis oil was mixed with methanol and MTBE in the weight ratio of 1:1:1. In yet another embodiment of the current invention, the wood-based pyrolysis oil was combined with methanol and MTBE in the ratio of 3:1:10.

According to one embodiment of the current invention, the above described solvent added to the biomass derived biocrude is given sufficient contacting time to mix with the biocrude thereby forming a mixture. The contacting time required for mixing the solvent with the biocrude may be affected by temperature of the biocrude as well as the device for mixing. Any suitable mixing device capable of mixing the biomass derived biocrude and solvent may be used, this includes but not limited to mixer, stirrer, ultrasonic bath and etc. In one embodiment, such contacting time is at least 1 minute under dynamic mixing action provided by devices such as stirrer or high shear mixers. The temperature of the mixture is maintained in the range of from room temperature to 50° C. during the mixing of solvent with the biocrude.

Further according to one embodiment of the current invention, the above described mixture after mixing is then separated via a separation device to form a liquid phase and a solid phase. Any suitable separation device capable of separating the solid from an oil phase may be used, this includes but not limited to filtration such as gravity filter, rotary vacuum filter, cartridge filter, separation funnel, decanting method, centrifugation, and etc. A separation device according to one embodiment of the current invention is a commercially available centrifuge.

According to the present invention, the treated biocrude after the inventive process comprises significantly lower amounts of the metal impurities compared to the untreated biocrude. Referring to one embodiment of the current invention, the treated biocrude after the inventive process comprises less than 50% of the amount of the metal impurities compare to which is in the biocrude prior to the inventive process. In another embodiment where a corn fiber pyrolysis oil/methanol/MTBE were mixed in the weight ratio of 1:1:1, the treated biocrude after the inventive process comprises less than 37% of the amount of the metal impurities compare to which is in the corn fiber pyrolysis oil prior to the inventive process.

According to the present invention, the treated biocrude after the inventive process comprises a significantly lower amount of the high molecular weight component than it is in the biocrude prior to the inventive process. In one embodiment where wood-based pyrolysis oil/methanol/MTBE were mixed in the weight ratio of 3:1:10, the treated biocrude showed selective removal of high molecular weight components, which were present in the feedstock prior to the inventive process.

According to one embodiment of the current invention, the treated biomass derived liquid biocrude (also refer to as recovered liquid phase as mentioned above) after the above separation step can be contacted with a catalyst composition under a condition sufficient to produce a reaction product containing fuel boiling range hydrocarbons.

A useful suitable catalyst composition according to one embodiment of the current invention includes hydrotreating catalyst which is effective in the conversion of the treated biomass derived biocrude to gasoline or/and diesel boiling range hydrocarbons when contacted under suitable reaction conditions. Another useful suitable catalyst composition according to one embodiment of the current invention includes zeolite catalyst which is effective in the conversion of the treated biomass derived biocrude to gasoline boiling range hydrocarbons when contacted under suitable reaction conditions. Examples of suitable zeolites include, but are not limited to, ZSM-5, ZSM-8, ZSM-11, ZSM-12, ZSM-35, ZSM-38 and combinations thereof.

The term "hydrotreating" as used herein, generally describes a catalyst that is capable of utilizing hydrogen to accomplish saturation of unsaturated materials, such as aromatic compounds. Examples of hydrotreating catalysts useful in the present invention include, but are not limited to, materials containing compounds selected from Group VI and Group VIII metals, and their oxides and sulfides. Examples of hydrotreating catalysts include but are not limited to alumina supported cobalt-molybdenum, nickel sulfide, nickel-tungsten, cobalt-tungsten, nickel-molybdenum and nickel-tungsten-molybdenum.

The metal of the catalyst useful in the present invention is usually distributed over the surface of a support in a manner than maximizes the surface area of the metal. Examples of suitable support materials for the hydrogenation catalysts include, but are not limited to, silica, silica-alumina, aluminum oxide ($Al_2O_3$), silica-magnesia, silica-titania and acidic zeolites of natural or synthetic origin. The metal catalyst may be prepared by any method known in the art, including combining the metal with the support using conventional means including but not limited to impregnation, ion exchange and vapor deposition. In an embodiment of the present invention, the catalyst contains molybdenum and cobalt supported on alumina or molybdenum and nickel supported on alumina.

This process in accordance with one embodiment of the current invention can be carried out in any suitable reaction zone that enables intimate contact of the treated biomass derived biocrude with the catalyst and control of the operating conditions under a set of reaction conditions that include total pressure, temperature, liquid hourly space velocity, and hydrogen flow rate. The process may be carried out in batch, semi-continuous, or continuous operation. In one embodiment of the present invention, a batch operation in a conventional autoclave is used.

The catalyst can be added first to the reactants and thereafter, fed with hydrogen. In the present invention, either fixed bed reactors or fluidized bed reactors can be used. As used herein, the term "fluidized bed reactor" denotes a reactor wherein a fluid feed can be contacted with solid particles in a manner such that the solid particles are at least partly suspended within the reaction zone by the flow of the fluid feed through the reaction zone and the solid particles are substantially free to move about within the reaction zone as driven by the flow of the fluid feed through the reaction zone. As used herein, the term "fluid" denotes gas, liquid, vapor and combinations thereof.

In accordance with the present invention, regardless of whether a fixed or fluidized bed reactor is used, the pressure is generally in the range of from about 100 pounds per square inch gauge (psig) to about 2000 psig. Generally, in a fixed bed reactor, the pressure is in the range of from about 100 psig to about 1500 psig. In a fixed bed reactor, the pressure can also be about 600 psig. In a fluidized bed reactor, the pressure is generally in the range of from about 400 psig to about 750 psig, and can also be about 500 psig.

Generally, the reaction conditions at which the reaction zone is maintained generally include a temperature in the range of from about 260° C. to about 430° C. Preferably, the temperature is in the range of from about 310° C. to about 370° C.

In one embodiment of the current invention, the reaction conditions at which the reaction zone is maintained generally include a temperature in the range of from about 200° C. to about 800° C. In another embodiment, the temperature is in the range of from about 310° C. to about 370° C. In one embodiment, the pressure is controlled in the range of from about 1 pound per square inch gauge (psig) to about 2000 psig. In another embodiment, the pressure is controlled in the range of 1-500 psig.

The following examples of certain embodiments of the invention are presented to further illustrate the present invention and are not to be construed as unduly limiting or defining the scope of this invention.

EXAMPLE 1

Materials and Methods:

Various solvent combinations were tested with corn fiber pyrolysis oil and BTG wood-based pyrolysis oil. As the pyrolysis oils were already known to be essentially completely insoluble in toluene or hydrocarbons, combinations of methanol and hydrocarbons were tested. Solutions of each pyrolysis oil at 71 wt % and 50 wt % in methanol (first solvent) were prepared. To these mixtures the second solvent was added dropwise, mixed vigorously and observed for evidence of solids or tar-like precipitation.

Results:

TABLE 1

| Pyrolysis Oil/first solvent Mixture | Second Solvent | | | |
|---|---|---|---|---|
| | Toluene | Diesel | MTBE | Heptane |
| 71 wt % Corn fiber py oil/29 wt % MeOH | Miscible up to 60 wt % toluene after which two layers appeared | At 25 wt % diesel, clearly evident diesel layer, low solubility of py oil in diesel | 25 wt % MTBE is miscible; 40 wt % MTBE showed dark precipitate | At 25 wt % added heptane a second layer visible, no solubility of py oil indicated |
| 71 wt % BTG py oil/29 wt % MeOH | 25 wt % toluene was soluble; 40 wt % gave two layers | Insoluble | Begin seeing precipitate at 60 wt % MTBE, more clearly precipitated at 70 wt % MTBE | Insoluble |
| 50 wt % Corn fiber py oil/50 wt % MeOH | Toluene miscible up to 75 wt %, then second layer separated | Miscible up to ~55 wt %, then two layers formed | Precipitate formed at 40 wt % | Not done |
| 50 wt % BTG py oil/50 wt % MeOH | Soluble up to 57 wt % toluene, two layers at 86 wt % | Insoluble | Soluble up to 73 wt % MTBE, then flocculent precipitate formed | Not done |

Only MTBE formed precipitates with the pyrolysis oil/MeOH mixtures. The other solvents showed too low a solubility of the pyrolysis oil/methanol mixture and formed a second liquid layer.

Larger mixtures were made of pyrolysis oil/methanol/MTBE for each oil type in order to isolate and characterize the precipitate and supernatant. The corn fiber pyrolysis oil was mixed with methanol and MTBE in the weight ratio of 1:1:1. The BTG wood-based pyrolysis oil was combined with methanol and MTBE in the ratio of 3:1:10. The samples were mixed vigorously and then centrifuged at 2500 rpm for 30 minutes. The supernatant was decanted and weighed. The solids were allowed to dry in the hood. The solids and supernatants were analyzed by gel permeation chromatography (GPC) to see if high molecular weight components were preferentially precipitated. The precipitate and supernatant from the corn fiber pyrolysis oil were also sent for ICP to see how the metals distributed in the two fractions.

In the example of the BTG wood-based oil it was clear from the GPC analysis that the MTBE preferentially precipitated high molecular weight compounds. The precipitate obtained from the BTG oil was 0.97 wt % of the original pyrolysis oil (with a 98% mass balance of the two fractions). The GPC analysis of the corn fiber-based oil did not show significant preferential high molecular weight precipitation.

Analysis for metals removal by ICP showed that precipitation by MTBE removed 63% of the total metals, with some metals (Mg, K, Ca) being removed at 85% or higher (FIG. 1). The weight of the corn fiber precipitate was 13% of the corn fiber oil.

Figure 2:
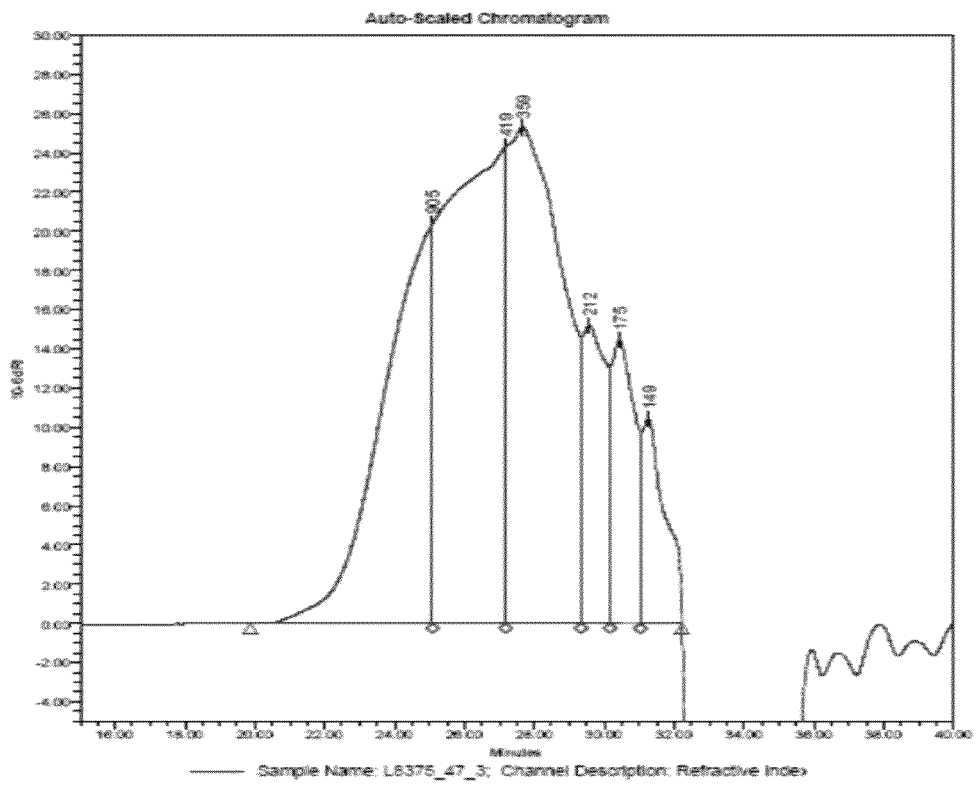
FIG. 2: Gel Permeation Chromatography Trace of the BTG Wood-Based Pyrolysis Oil Following Precipitation of the High Molecular Weight Components using MeOH/MTBE.
Figure 3:
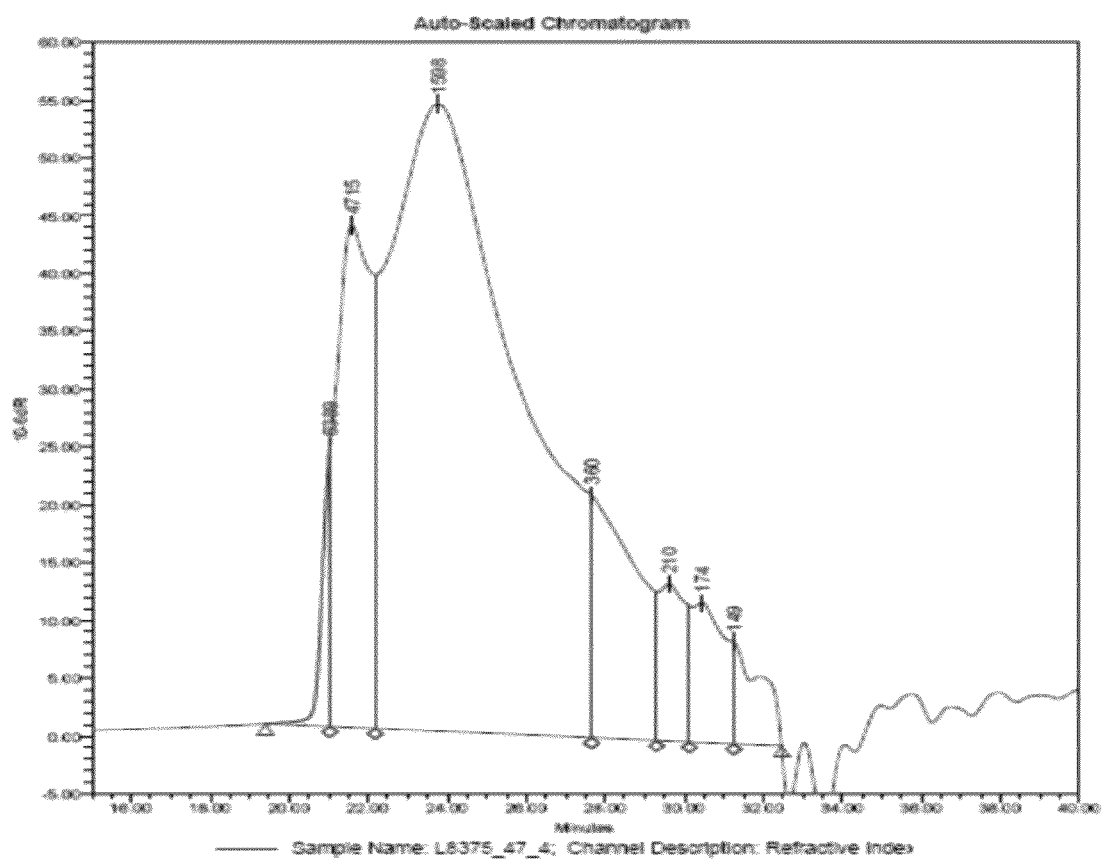
FIG. 3: Gel Permeation Chromatography Trace of the Precipitated High Molecular Weight Components in BTG Pyrolysis Oil Following MeOH/MTBE Precipitation.
Figure 4:
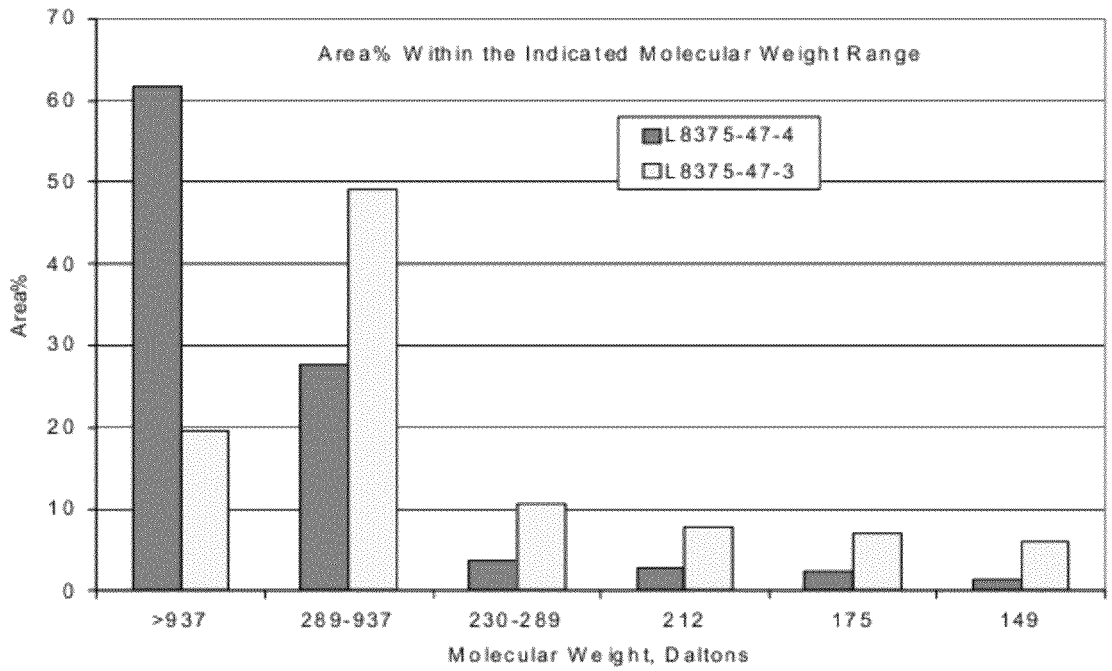
FIG. 4: Selectivity of the MeOH/MTBE Solvent Precipitation of High Molecular Weight Components: Comparison of the Molecular Weight Range of the Treated BTG Py Oil (L8375-47-3) to the Precipitate (L8375-47-4).

FIGS. 2-4 illustrate the selectivity of the MeOH/MTBE solvent mixture for removing high molecular weight components from the pyrolysis oil. FIGS. 2 and 3 are the gel permeation chromatography traces of the treated pyrolysis oil product and the high molecular weight precipitate obtained, respectively. FIG. 2 shows the BTG pyrolysis oil after it has been treated with MeOH/MTBE solvent to remove the high molecular weight components. In FIG. 2, it can be seen that the majority of the product has a molecular weight ranging from 212 to 904 Daltons. The largest proportion of the product has a molecular weight of 359 Daltons. FIG. 3 shows the trace of the precipitate obtained from treating the BTG pyrolysis oil with the MeOH/MTBE. This product, as seen in FIG. 3, has a majority of components ranging from 360 to 6,359 Daltons in molecular weight, with the largest proportion having a molecular weight of 1,598 Daltons. FIG. 4 further quantifies this selectivity. The precipitated product from treating the BTG pyrolysis oil with MeOH/MTBE solvent, designated sample L8375-47-4, has 62% of components with a molecular weight>937 Daltons. By contrast, the BTG pyrolysis oil after treatment with the MeOH/MTBE solvent (sample L8375-47-3) has <20% with a molecular weight>937 Daltons.

Although the systems and processes described herein have been described in detail, it should be understood that various changes, substitutions, and alterations can be made without departing from the spirit and scope of the invention as defined by the following claims. Those skilled in the art may be able to study the preferred embodiments and identify other ways to practice the invention that are not exactly as described herein. It is the intent of the inventors that variations and equivalents of the invention are within the scope of the claims while the description, abstract and drawings are not to be used to limit the scope of the invention. The invention is specifically intended to be as broad as the claims below and their equivalents.

The invention claimed is:

1. A process comprising the steps of:
   a) providing a biocrude derived from biomass, wherein the biomass comprises at least one metal impurity and at least one high molecular weight component;
   b) admixing said biocrude with a first solvent and a second solvent to form a mixture, wherein said first solvent comprises at least one of methanol, ethanol, propanol or acetone, wherein said second solvent comprises at least one of methyl ether, diethyl ether, dipropyl ether, tetrahydrofuran, tetrahydrofurfuryl alcohol, or methyl tert-butyl ether;
   c) subjecting said mixture to a separation device to form a liquid phase and a solid phase, wherein said liquid phase comprises less than 20% (by weight) of components having a molecular weight greater than 937 Daltons; and
   d) recovering said liquid phase.

2. The process of claim 1, wherein said liquid phase comprises less than 50% of the total metal impurity from said biocrude in step (a), and wherein said liquid phase comprises less than 15% of any high molecular weight components from said biocrude in step (a).

3. The process of claim 1, wherein said biomass derived biocrude comprises sugar monomer, wherein said sugar monomer comprises at least one sugar alcohol, one sugar, or any combination thereof.

4. The process of claim 1, wherein said biomass derived biocrude comprises at least one of tars, pyrolysis oil, pyrolytic lignin, acids, chars, alcohols, aldehydes, esters, ketone, aromatics, or any combination thereof.

5. The process one of claim 1, wherein said high molecular weight component has a molecular weight of at least 937 Daltons.

6. The process of claim 1, wherein said metal impurity comprises at least one of Na, K, Ca, Mg, Fe, Al, Si, Mn and P.

7. The process of claim 1, wherein said high molecular component comprises at least one of organic oligomers, polymers or combination thereof, and wherein said organic oligomers or said polymers are derived from at least one of carbohydrate, lignin components, or combination thereof, in the biomass.

8. The process of claim 1, wherein said second solvent comprises at least one of methyl ether, diethyl ether, dipropyl ether, tetrahydrofuran, tetrahydrofurfuryl alcohol, or any combination thereof.

9. The process of claim 1, wherein said biomass derived biocrude is pyrolysis oil, wherein said pyrolysis oil is mixed with said first solvent and said second solvent in a weight ratio of between one and ten parts pyrolysis oil to one part of said first solvent also to between one and 20 parts of said second solvent.

10. The process of claim 1,
    wherein said biomass derived biocrude is corn fiber-based pyrolysis oil,
    wherein said first solvent is methanol,
    wherein said second solvent is methyl-t-butyl ether (MTBE),
    wherein said corn fiber-based pyrolysis oil is mixed with said methanol and said MTBE in the weight ratio of 1:1:1,
    wherein said liquid phase comprises less than 37% of the amount of said metal impurity compare to which is in said biomass derived biocrude in said step (a), and wherein said liquid phase comprises less than 15% of the amount of said high molecular weight component compare to which is in said biomass derived biocrude in step (a).

11. The process of claim 1,
    wherein said biomass derived biocrude is wood-based pyrolysis oil,
    wherein said first solvent is methanol,
    wherein said second solvent is methyl-t-butyl ether (MTBE),
    wherein said wood-based pyrolysis oil is mixed with said methanol and said MTBE in the weight ratio of 3:1:10,
    wherein said liquid phase has a decreased amount of said high molecular weight components compare to which is in said wood-based pyrolysis oil.

12. The process of claim 11,
    wherein said wood-based pyrolysis oil comprises components having a molecular weight range from 360 to 6359 Daltons, and
    wherein said liquid phase contains less than 20% (by weight) of components with molecular weight greater than 937 Daltons.

13. The process of claim 1,
    wherein said wood-based pyrolysis oil comprises at least 62% of components with molecular weight of greater than 937 Dalton, and
    wherein said liquid phase comprises less than 20% of components with molecular weight of greater than 937 Dalton.

14. The process of claim 1, further including the step of reacting said liquid phase with a catalyst under a condition sufficient to produce a reaction product containing fuel range hydrocarbon.

15. The process of claim 14,
    wherein said catalyst is hydrotreating catalyst comprises at least one of molybdenum, cobalt, nickel and tungsten;
    wherein said condition includes a pressure range of from about 100 to about 2000 psig and a temperature in the range of from about 260° C. to about 430° C.; and
    wherein said fuel range hydrocarbon is a gasoline or a diesel boiling range hydrocarbon.

16. The process of claim 14,
    wherein said catalyst is hydrotreating catalyst comprising molybdenum and nickel;
    wherein said condition includes a pressure range of from about 100 to 2000 psig and a temperature in the range of from about 260° C. to about 430° C.; and
    wherein said fuel range hydrocarbon is a diesel boiling range hydrocarbon.

17. The process of claim 14,
    wherein said catalyst comprises zeolite,
    wherein said condition includes a pressure range of from about 1 to about 500 psig and a temperature in the range of from about 200° C. to about 800° C.; and
    wherein said fuel range hydrocarbon is gasoline boiling range hydrocarbon.

18. The process of claim 1, wherein said zeolite is selected from the group consisting of ZSM-5, ZSM-8, ZSM-11, ZSM-12, ZSM-35, ZSM-38 and combinations thereof.

19. The process of claim 1 further including the step of pyrolyzing a biomass to produce said biocrude provided in step (a).

* * * * *